US007892515B2

(12) United States Patent
Hu et al.

(10) Patent No.: US 7,892,515 B2
(45) Date of Patent: Feb. 22, 2011

(54) MAKING MESOPOROUS CARBON WITH TUNABLE PORE SIZE

(75) Inventors: Qingyuan Hu, New Orleans, LA (US); Yunfeng Lu, New Orleans, LA (US); Jing Tang, New Orleans, LA (US); Mei Cai, Bloomfield Hills, MI (US)

(73) Assignees: GM Global Technolgy Operations LLC, Detroit, MI (US); Tulane University; Administrators of the Tulane Education Fund, New Orleans, LA (US)

( * ) Notice: Subject to any disclaimer, the term of this patent is extended or adjusted under 35 U.S.C. 154(b) by 848 days.

(21) Appl. No.: 11/752,968

(22) Filed: May 24, 2007

(65) Prior Publication Data

US 2010/0021366 A1 Jan. 28, 2010

Related U.S. Application Data

(60) Provisional application No. 60/811,720, filed on Jun. 7, 2006.

(51) Int. Cl.
C04B 26/12 (2006.01)
C01B 33/12 (2006.01)
C01B 31/00 (2006.01)
(52) U.S. Cl. ............ 423/445 R; 423/335; 524/594
(58) Field of Classification Search .......... None
See application file for complete search history.

(56) References Cited

U.S. PATENT DOCUMENTS

| 3,518,206 | A | 6/1970 | Sowards et al. | |
| 6,559,070 | B1 | 5/2003 | Mandal | |
| 6,585,948 | B1 * | 7/2003 | Ryoo et al. | 423/445 R |
| 2005/0036935 | A1 * | 2/2005 | Pak et al. | 423/445 R |
| 2005/0207962 | A1 * | 9/2005 | Dietz et al. | 423/445 R |
| 2006/0116284 | A1 | 6/2006 | Pak et al. | |
| 2006/0133981 | A1 * | 6/2006 | Jaroniec et al. | 423/445 R |
| 2006/0263288 | A1 * | 11/2006 | Pak et al. | 423/445 R |
| 2007/0122334 | A1 * | 5/2007 | Pak et al. | 423/445 R |

OTHER PUBLICATIONS

Klepel et al.; Templated Synthesis of Mesoporous Carbon From Sucrose—The way From the Silica Pore Filling to the Carbon Material; Carbon 43, pp. 1918-1925; Apr. 14, 2005.*
Kawashima et al.; Preparation of Mesoporous Carbon from Organic Polymer/Silica Nanocomposite.*
Schuster et al.; Silicon Carbide Derived From Silica Sol and Sugar; Journal of Material Science Letters; 14, 620-622; 1995.*

* cited by examiner

*Primary Examiner*—Melvin C Mayes
*Assistant Examiner*—Guinever S Gregorio
(74) *Attorney, Agent, or Firm*—Reising Ethington P.C.

(57) ABSTRACT

Carbon with mesopores (about two to fifteen nanometers in average pore size) is made using sucrose as a source of carbon, and silica and phosphoric acid as templates for the mesopore structure in the carbon. A silica sol is prepared in a water/ethanol medium and sucrose is dispersed in the sol. Phosphoric acid may be added to the sol to control pore size in the mesopore size range. The sol is dried, carbonized, and the silica and phosphate materials removed by leaching. The residue is a mesoporous carbon mass having utility as a catalyst support, gas absorbent, and the like.

3 Claims, 3 Drawing Sheets

TEM image of the mesoporous carbon prepared with a P/Si ratio of 0

TEM image of the mesoporous carbon prepared with a P/Si ratio of 0.17.

TEM image of the mesoporous carbon prepared with a P/Si ratio of 0.34.

MAKING MESOPOROUS CARBON WITH TUNABLE PORE SIZE

This application claims priority based on provisional application 60/811,720, titled "Making Mesoporous Carbon with Tunable Pore Size," filed Jun. 7, 2006 and which is incorporated herein by reference.

TECHNICAL FIELD

This invention pertains to the making of porous carbon particles. More specifically, this invention pertains to the making of mesoporous carbon.

BACKGROUND OF THE INVENTION

Porous carbons are useful materials for a wide range of applications like catalysis, purifications, fuel cell electrodes, and gas storage. The development of porous carbons as catalyst supports for fuel cell electrodes is of current interest for vehicle propulsion applications.

Porous carbons may have pores that vary over a range of pore sizes and these pore sizes have been categorized or classified. Pore sizes uniformly, in the size range of two to fifty nanometers in opening size, are called mesopores and carbon particles with mesopores are favored for fuel cell electrode applications. Smaller pore sizes, less than about two nanometers are termed micropores. Such pore sizes are usually too small for fuel cell catalyst support applications. Larger pore sizes, greater than about fifty nanometers, are termed macropores. Macropore size support particles are typically too large for fuel cell catalyst applications.

The most commonly used porous carbon materials are activated carbons, which are often produced through a physical or chemical activation process that produces microporosity. Activated carbons are typically microporous (pore diameter<2 nm) and contain widely distributed micro-, meso- and macro-pores. They often contain high surface areas ranging from 800 to 1500 $m^2/g$. The small-sized micropores, however, may limit their applications where rapid mass transport or larger pore sizes are required. In order to overcome the limitations, there have been a great deal of interest in the synthesis of mesoporous carbon, a class of porous carbons with attractive characteristics, such as larger pore size, narrow pore-size distribution, high surface area, large pore volume and highly ordered framework structure.

This invention provides a method of making carbon particles with mesopores.

SUMMARY OF THE INVENTION

Common sucrose is suitably used as a source or precursor of carbon in the method of this invention and silica species are used as templates to form generally uniformly sized mesopores in the resultant carbon. Phosphoric acid can be used in combination with the silica template to increase average mesopore diameter. Phosphoric acid may also promote the formation of increased surface area on the carbon. While other carbon sources may be used, sucrose is abundantly available at low cost and is readily dispersed with the other mesoporous carbon forming materials.

The mesoporous carbon forming method is advantageously practiced as follows. A silica sol is prepared as a fine dispersion in a liquid medium such as a mixture of water and ethanol. Sucrose is dissolved or dispersed in the sol. Optionally, a suitable quantity of phosphoric acid is likewise added to the sol depending on the average pore diameter wanted in the carbon product. The molar ratio of P (phosphorus, added as phosphoric acid to Si (silicon, added as silica) is suitably in the range of 0 to about 0.43. The mixture is stirred for uniform dispersal of the sucrose, silica, and phosphoric acid (if present).

The water and alcohol are evaporated to leave nanocomposite solid, typically transparent brown particles. The material is then carbonized at about 900° C. under nitrogen. Silica and phosphorus are removed from the carbonized material to leave mesoporous carbon. Silica is suitably removed by leaching with aqueous hydrogen fluoride and water typically removes phosphate and other phosphorus-containing residue.

The mesoporous carbon can be produced with mesopores of fairly uniform size, typically in the range of about two nanometers to about fifteen nanometers. As stated, using larger amounts of phosphoric acid (higher P/Si) produces higher average pore size in the carbon material.

The mesoporous carbon has utility as a support for catalyst particles and as a gas absorbent.

Other objects and advantages of the invention will be apparent from a description of preferred embodiments which follows.

DESCRIPTION OF PREFERRED EMBODIMENTS

This invention provides a direct-synthesis method to fabricate mesoporous carbon with uniform pore size tunable up to about 15 nm. The subject method comprises the following three steps: (1) the formation of silica/sucrose nanocomposites that optionally contain phosphoric acid, an activation agent often used in the production of commercial activated carbons; (2) carbonization of the nanocomposites in an inert atmosphere; and (3) dissolution of the silica template and the phosphate, if present.

Examples of detailed experimental steps are as follows: 2.08 g of tetraethyl orthosilicate (TEOS), a preferred silica precursor, was pre-reacted at 60° C. for 4 hours in acidic ethanol/water solution. The molar ratio of TEOS:water:ethanol:HCl was maintained at 1:6:6:0.01. The pre-reacted sol was then mixed with 0.9 g of sucrose, 2 g of $H_2O$ and different amounts of $H_3PO_4$, stirred for 1 hour and dried at room temperature to form transparent brown nanocomposites. The material was in powder form containing large clumps of the powder. The molar ratios of phosphoric acid to TEOS (P/Si) ranged from 0 to 0.43.

The nanocomposites were then carbonized at 900° C. under nitrogen for 4 hours. The material was then washed using 20% HF and, later, deionized water to remove silica and phosphoric acid components. The complete removal of silica and phosphate was confirmed by energy dispersive X-ray (EDX) analysis and thermogravimetric analyses (TGA). The residue was mesoporous carbon powder.

Figure 1:
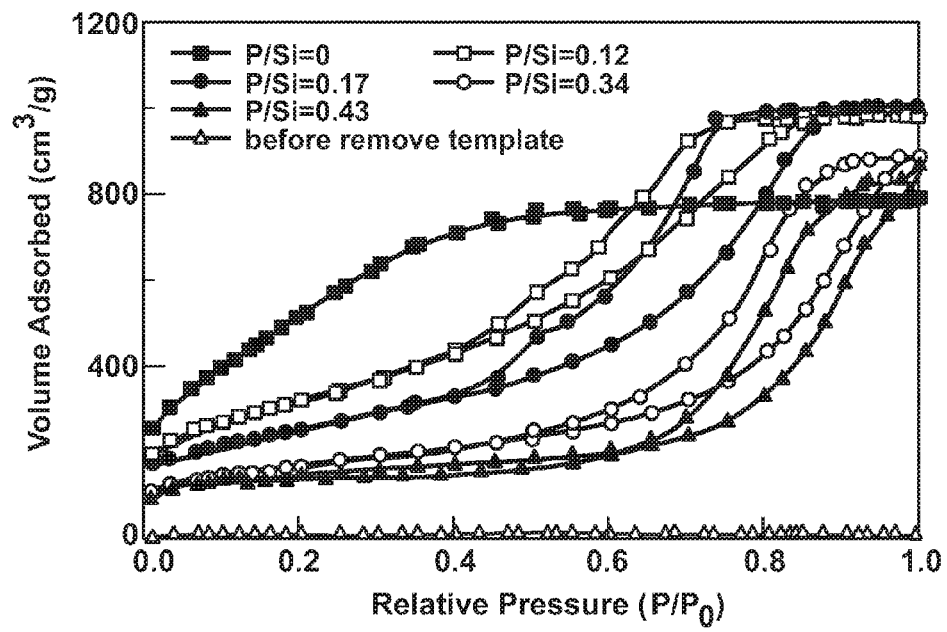
FIG. 1 is a graph of six representative nitrogen adsorption/desorption isotherms of mesoporous carbons prepared using P/Si molar ratios ranging from 0 to 0.43: P/Si=0 (filled squares), P/Si=0.12 (unfilled squares), P/Si=0.17 (filled circles), P/Si=0.34 (unfilled circles), and P/Si=0.43 (filled triangles). The unfilled triangle data along the baseline of FIG. 1 shows the negligible nitrogen absorption capability of the composite mixture of sucrose, silica, and phosphoric acid before the silica and phosphoric acid were removed.

FIG. 1 shows representative nitrogen adsorption/desorption isotherms of the mesoporous carbons prepared using P/Si ratios ranging from 0 to 0.43. The nanocomposites prepared at all ranges of P/Si ratios are non-porous to nitrogen at 77K before template removal as seen in the unfilled triangle data of FIG. 1.

Removal of the silica and phosphoric acid template materials results in isotherms with significant nitrogen uptake, indicating that the porosities of the mesoporous carbons are created by the removal of the silica/phosphoric acid templates. When the P/Si ratio is less than 0.1, the resultant mesoporous carbons show isotherms similar to those of surfactant-templated mesoporous silica. The absence of hysteresis loops and the small amount of nitrogen uptake at relative pressures higher than 0.4 further indicate a narrow pore size distribution in the carbon material. As the P/Si ratio is increased, the hysteresis loops appear and shift towards the higher relative pressure, indicating an increasing pore size and broadened pore size distribution.

Figure 2:
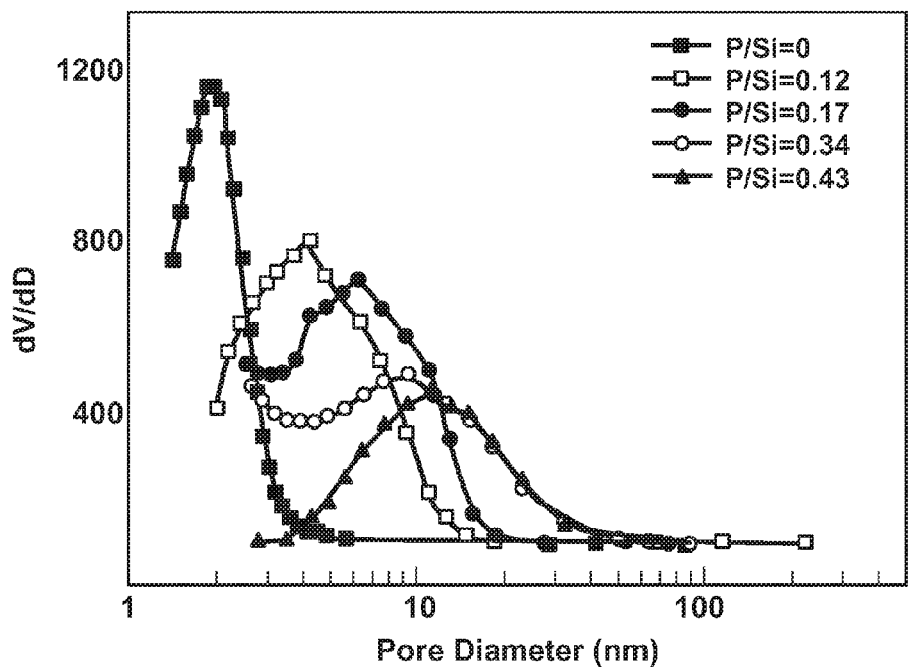
FIG. 2 is a graph of pore size distributions of mesoporous carbons prepared by practices of this invention. Pore size distributions are shown for different phosphoric acid and silica molar ratios: P/Si=0 (filled squares), P/Si=0.12 (unfilled squares), P/Si=0.17 (filled circles), P/Si=0.34 (unfilled circles), and P/Si=0.43 (filled triangles).

The pore size distribution of these mesoporous carbons are shown in FIG. 2. The pore sizes were measured by nitrogen adsorption and desorption tests conducted at 77K. The mesoporous carbon prepared at the P/Si ratio of zero shows a uniform pore size distribution centered at 2.1 nm. Increasing the P/Si ratio to values of 0.12, 0.17, 0.34, and 0.43, respectively, is seen to systemically increase the average pore diameter to 4.7, 6.2, 9.4, and 14.7 nm, respectively.

Figure 3A:
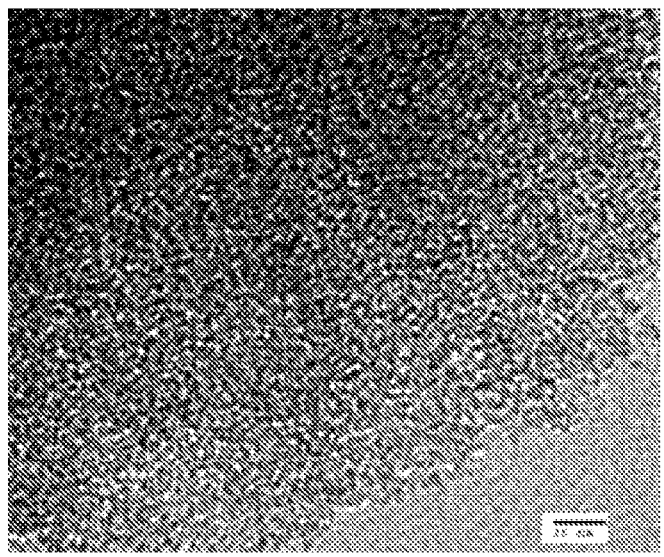
FIGS. 3A-3C are representative transmission electron microscope (TEM) images of the mesoporous carbons prepared with P/Si ratios of zero (FIG. 3A), 0.17 (FIG. 3B), and 0.34 (FIG. 3C).
Figure 3B:
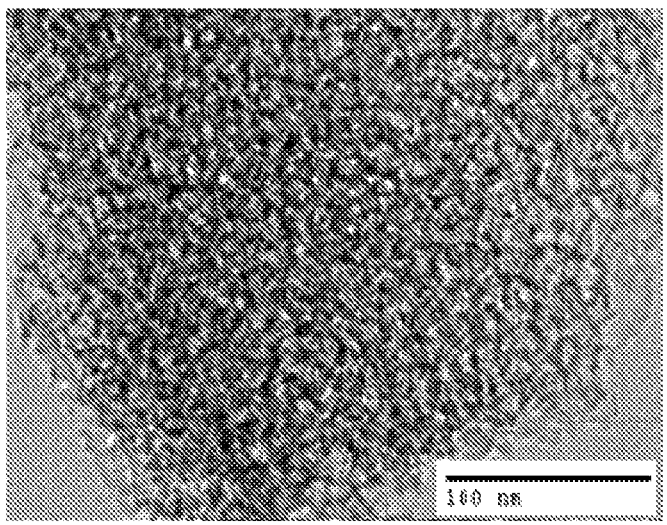
Figure 3C:
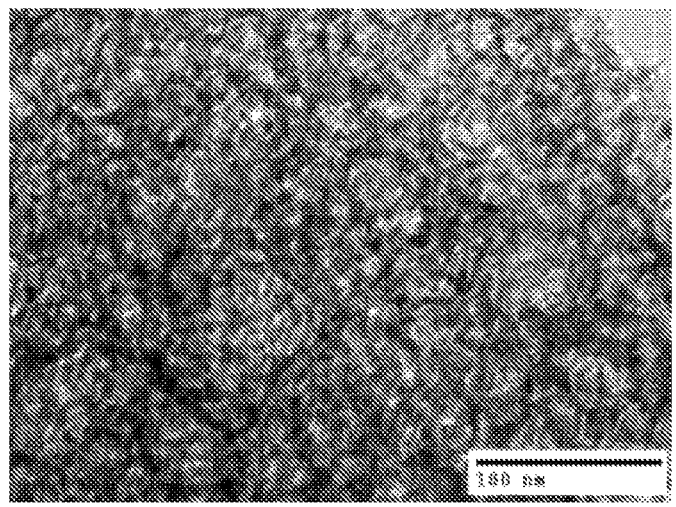

FIGS. 3A-3C respectively show representative TEM images of the mesoporous carbons prepared with the P/Si ratios of (FIG. 3A) 0, (3B) 0.17 and (3C) 0.34, showing disordered wormlike pore structure. Consistent with the results shown in FIG. 1, mesoporous carbon prepared without adding phosphoric acid (FIG. 3A) shows highly uniform pore structure with approximate 2 nm pore diameter. Mesoporous carbon prepared using the P/Si ratio of 0.17 (FIG. 3B) shows larger pore diameter and a rougher morphology. Further increasing the P/Si ratio to 0.34 results in porous carbon in which the individual pore could not be clearly observed (FIG. 3C). These results further confirm that the addition of phosphoric acid significantly enlarges the pores, agreeing well with the nitrogen adsorption results.

The carbon formation process in the subject method may involve co-assembly of silicate and sucrose into nanocomposites that contain a bi-continuous network structure, and a subsequent chemical activation process initiated by the incorporated phosphoric acid. Phosphoric acid, a well-known chemical activation agent, may react with a carbon precursor and form phosphates or polyphosphates with various lengths. A conventional activation process is often conducted at temperatures around 400 to 600° C., producing activated carbons containing the phosphate moieties that subsequently served as porogens (i.e., pore generators). Removal of the phosphate moieties by washing creates porous activated carbons with broadly distributed micro-porosity and mesoporosity. In the subject method, the incorporated phosphoric acid may also serve as an activation agent and promote the carbonization of sucrose, resulting in the formation of carbon/silica nanocomposites at a lower temperature.

To confirm the role of phosphoric acid, a comparison mesoporous carbon material was synthesized by replacing phosphoric acid with the same molar amount of hydrochloric acid. The resultant mesoporous carbons show similar pore diameters ranging from 2.1 nm to 2.6 nm even when the amount of hydrochloride acid used was 100 times higher than that of phosphoric acid used. Therefore, it is concluded that it is the incorporated phosphoric acid that leads to the significant pore enlargement.

Figure 4:
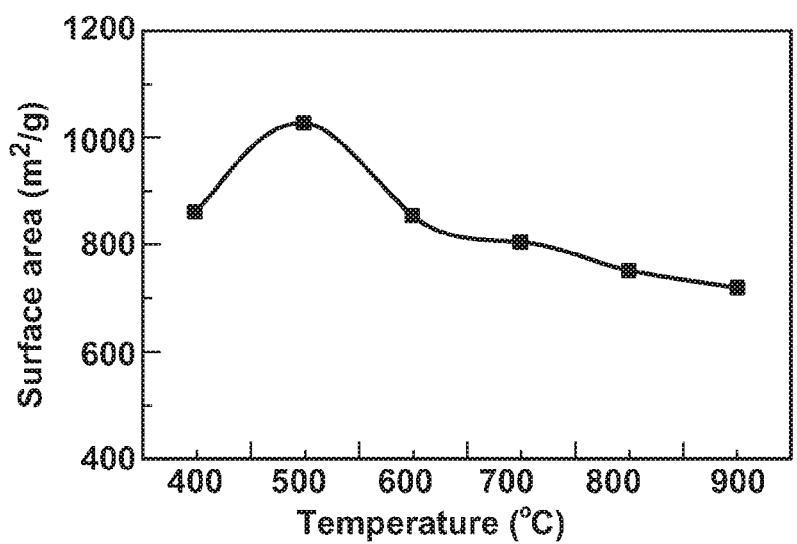
FIG. 4 is a graph of BET surface area ($m^2/g$) at temperatures ranging from 400° C. to 900° C. of the mesoporous carbon prepared at a P/Si molar ratio of 0.3.

To further confirm the presence of activation process, the nanocomposites (P/Si ratio of 0.3) were carbonized at temperatures ranging from 400 to 900° C. The graph of FIG. 4 shows surface areas of the resultant mesoporous carbons. A maximum surface area of 1026 $m^2/g$ was achieved at the carbonization temperature of 500° C. A higher activation temperature causes structural arrangement of carbon network and results in lower porosity and surface area. These results confirm that the added phosphoric acid does serve as an effective activation agent that contributes to the observed pore enlargement. Another advantage of the method of this invention is the low carbonization temperature (500° C.) compared with other methods (e.g., 800-1000° C. for a thermal activation process).

Compared with the conventional chemical activation process, our activation process was confined within the reactive inorganic silicate frameworks, resulting in silica/carbon nanocomposites with homogenous network structure. Subsequent removal of the template (silica and phosphates) creates mesoporous carbon whose pore structure is determined by template structure. A higher P/Si ratio may lead to a larger template and mesoporous carbon with larger pore size and higher porosity. However, further increasing the phosphate concentration may decrease the porosity due to the strong reactions between phosphoric acid and carbon materials.

While preferred embodiments of the invention have been illustrated by specific example, the scope of the invention is not limited by these illustrative examples.

The invention claimed is:

1. A method of making carbon with mesopores comprising:
    adding phosphoric acid and sucrose to a silica sol in a water-containing liquid medium for increasing the average size of the mesopores to a predetermined value;
    removing the liquid medium to form a dry mixture of sucrose, silica, and phosphoric acid;
    carbonizing the dry mixture to form a carbon-silica-phosphoric acid-containing mixture; and
    removing the silica and phosphoric acid from the carbon-silica-phosphoric acid-containing mixture to form mesoporous carbon.

2. A method of making carbon with mesopores as recited in claim 1 in which the silica sol is prepared from a silicate in a water-ethanol mixture.

3. A method of making carbon with mesopores as recited in claim 1 in which the silica sol is prepared from tetraethyl orthosilicate in a water-ethanol mixture.

* * * * *